(12) United States Patent
Mizutani

(10) Patent No.: US 7,438,966 B2
(45) Date of Patent: Oct. 21, 2008

(54) HONEYCOMB SEGMENT AND HONEYCOMB STRUCTURE USING THE HONEYCOMB SEGMENT

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/514,992

(22) Filed: Sep. 5, 2006

(65) Prior Publication Data

US 2007/0059485 A1 Mar. 15, 2007

(30) Foreign Application Priority Data

Sep. 14, 2005 (JP) ............... 2005-266934

(51) Int. Cl.
B32B 3/12 (2006.01)
(52) U.S. Cl. .................. 428/116; 428/117; 55/523
(58) Field of Classification Search ................. 428/116, 428/117
See application file for complete search history.

(56) References Cited

U.S. PATENT DOCUMENTS 4,568,402 A * 2/1986 Ogawa et al. ............ 156/89.22
6,827,754 B2 * 12/2004 Suwabe et al. ................ 55/523
7,041,359 B2 * 5/2006 Hijikata ..................... 428/116
2002/0135107 A1 * 9/2002 Nishi et al. .................. 264/630

FOREIGN PATENT DOCUMENTS

| EP | 1 293 241 A2 | 3/2003 |
| JP | A 2002-219317 | 8/2002 |
| JP | A-2003-126629 | 5/2003 |

* cited by examiner

Primary Examiner—Timothy M. Speer
Assistant Examiner—Gordon R Baldwin
(74) Attorney, Agent, or Firm—Oliff & Berridge, PLC

(57) ABSTRACT

A honeycomb segment 3 includes a plurality of cells 5 functioning as fluid passages and disposed in parallel with one another in the central axis direction. Cells at four corners of both end faces of the honeycomb segment 3 are plugged with a plugging material 7. Since occurrence of chipping or a crack during handling before joining honeycomb segments can be reduced, productivity and yield of a honeycomb structure can be improved with the honeycomb segment.

4 Claims, 3 Drawing Sheets

HONEYCOMB SEGMENT AND HONEYCOMB STRUCTURE USING THE HONEYCOMB SEGMENT

BACKGROUND OF THE INVENTION AND RELATED ART

The present invention relates to a honeycomb segment and a honeycomb structure using the honeycomb segment.

A honeycomb structure is incorporated in an exhaust gas system or the like of a diesel engine as a trapping filter for exhaust gas, for example, as a diesel particulate filter (DPF) in order to trap and remove particulate matter contained in exhaust gas from a diesel engine or the like. Such a honeycomb structure has a problem of having defects such as causing cracks and the likes by thermal stress due to uneven temperature rise in the whole honeycomb structure upon use (upon trapping and removing particulate matter) and upon regeneration (upon removing, by combustion, particulate matter accumulated inside a filter in order to reduce an increase in pressure loss due to particulate matter accumulated inside the filter in the course of time). From the viewpoint of solving such a problem, there is provided a honeycomb structure having reduced thermal stress by forming a honeycomb segment joined body having a plurality of honeycomb segments unitarily joined with one another at their joint faces by means of a bonding material layer.

However, since a honeycomb structure made of silicon carbide (SiC), whose use is expected because it has an advantage of excellent thermal resistance, has a high thermal expansion coefficient in comparison with a cordierite honeycomb structure and a disadvantage of inferior thermal shock resistance, it has a problem of difficulty in making good use of the advantage sufficiently. In addition, according to recent increase in size of a filter, thermal stress generated upon use or regeneration has been increased remarkably, and thereby frequency and extent in generation of a defect based on thermal stress have rapidly fallen into a serious state.

To cope with such a problem, there is disclosed a method for manufacturing a ceramic structure (honeycomb structure), the method being characterized by including a step of forming an adhesive paste layer (bonding material layer) on a side face of a porous ceramic member (honeycomb segment) so as to cover 60% or more of the total area of the side face and a step of piling up ceramic blocks by repeating a step of laminating other porous ceramic members (see Patent Document 1).

However, in the ceramic structure (honeycomb structure) disclosed in Patent Document 1, its rigid joint structure all the more increases thermal stress generated from a temperature gradient, and the joint member has a large thermal capacity and a low temperature rise or fall rate in comparison with a porous ceramic member, which easily increases a temperature gradient inside the filter. Therefore, there is a problem of insufficiently inhibiting a defect due to thermal stress from being generated.

In addition, inferiority of chipping, cracks and the like are prone to occur intensively on cells at the four corners of the honeycomb segment upon conveyance of the honeycomb segment or upon handling the honeycomb segment before joining. Since it is difficult to decrease inferiority of honeycomb segments even with careful handling of the honeycomb segments, it causes deterioration in productivity or a yield of a ceramic structure (honeycomb structure) as a finished product.

Patent Document 1: JP-A-2002-219317

The present invention has been made in view of the above problems and objects to provide a honeycomb segment capable of improving productivity and a yield of a honeycomb structure. Because occurrence of a chip or a crack during handling before joining honeycomb segments can be reduced by enhancing mechanical strength of the honeycomb segments constituting the honeycomb structure.

SUMMARY OF THE INVENTION

In order to achieve the above objects, according to the present invention, there is provided the following honeycomb segment and a honeycomb structure using the honeycomb segment.

[1] A honeycomb segment having a plurality of cells functioning as fluid passages and disposed in parallel with one another in the central axis direction, wherein cells at four corners of both end faces of the honeycomb segment are plugged with a plugging material.

[2] The honeycomb segment according to above [1], wherein adjacent cells of the honeycomb segment are plugged with a plugging material at opposite end faces alternately.

[3] A honeycomb structure comprising:
a honeycomb segment joined body having a plurality of honeycomb segments unitarily joined at the joint faces by means of a bonding material layer, and
an outer peripheral coating layer covering an outer peripheral surface of the honeycomb segment joined body,
the honeycomb structure having a structure in which a plurality of cells functioning as fluid passages are disposed in parallel with one another in a central axis direction;
wherein each of the honeycomb segments is a honeycomb segment according to above [1] or [2].

A honeycomb segment of the present invention can improve productivity and yield of a honeycomb structure. Because occurrence of a chip or a crack during handling before joining honeycomb segments can be reduced by enhancing mechanical strength of the honeycomb segments constituting the honeycomb structure.

DETAILED DESCRIPTION OF THE INVENTION

A honeycomb structure of the present invention will hereinbelow be described in detail on the basis of specific embodiments. However, the present invention is by no means limited to these embodiments, and various kinds of change, modification, and improvement may be added based on knowledge of a person ordinary skill in the art as long as it does not deviate from a range of the present invention.

A honeycomb segment of the present invention is a honeycomb segment having a plurality of cells functioning as fluid passages and disposed in parallel with one another in the central axis direction, and cells at four corners of both end faces of the honeycomb segment are plugged with a plugging material. Incidentally, in a honeycomb segment of the present invention, adjacent cells of the honeycomb segment may be plugged with a plugging material on the end faces alternately.

Because occurrence of a chip or a crack during handling before joining honeycomb segments can be reduced by enhancing mechanical strength of the honeycomb segments constituting the honeycomb structure by this, a honeycomb segment of the present invention can improve productivity and yield of a honeycomb structure.

Next, a honeycomb segment of the present invention and a honeycomb structure using the honeycomb segment will be described more concretely on the basis of drawings.

Figure 1:
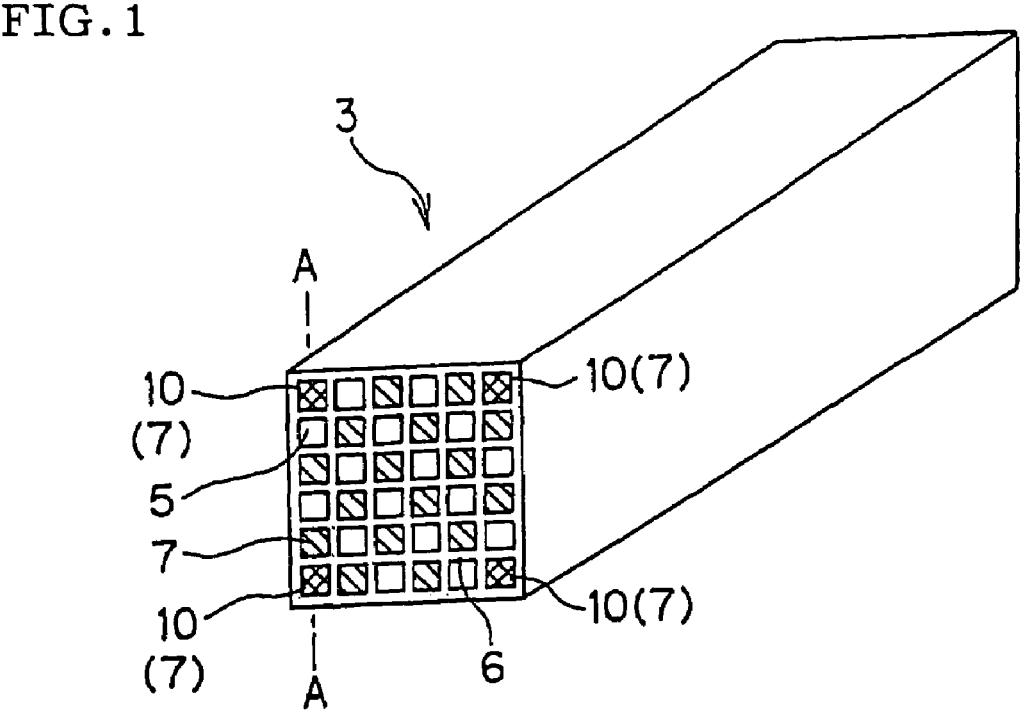
FIG. 1 is a perspective view schematically showing an example of a honeycomb segment of the present invention.
Figure 2:
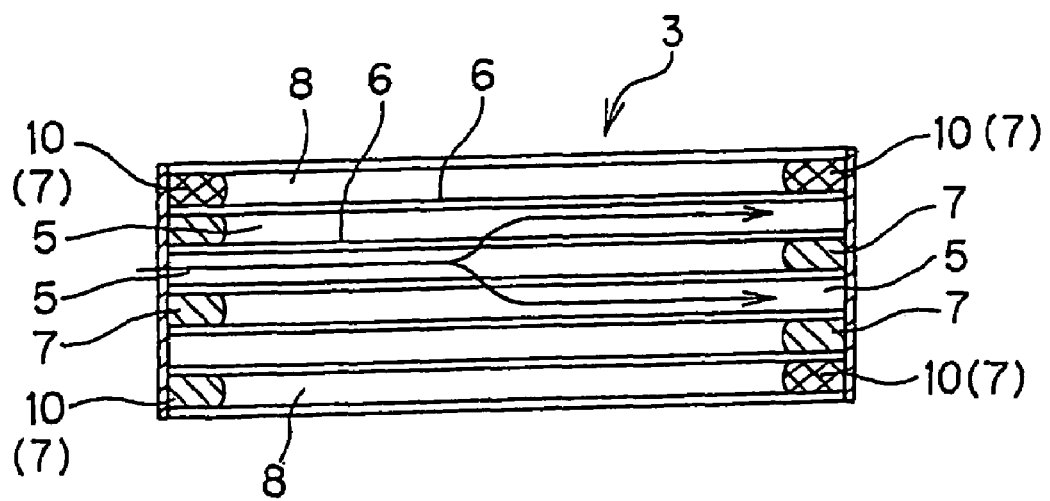
FIG. 2 is an A-A sectional view in FIG. 1.
Figure 3:
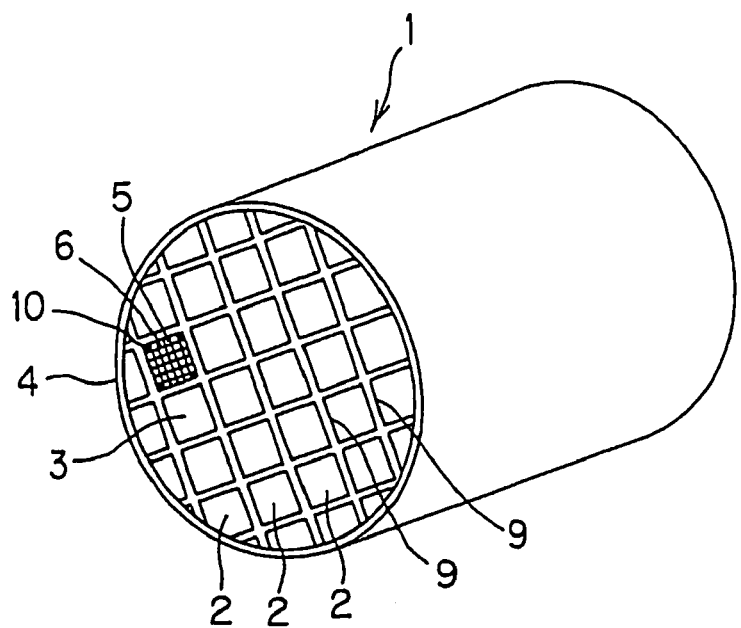
FIG. 3 is a perspective view schematically showing an example (having a circular shape of the whole cross-section taken on a plane perpendicular to the central axis) of a honeycomb structure using a honeycomb segment of the present invention.
Figure 4:
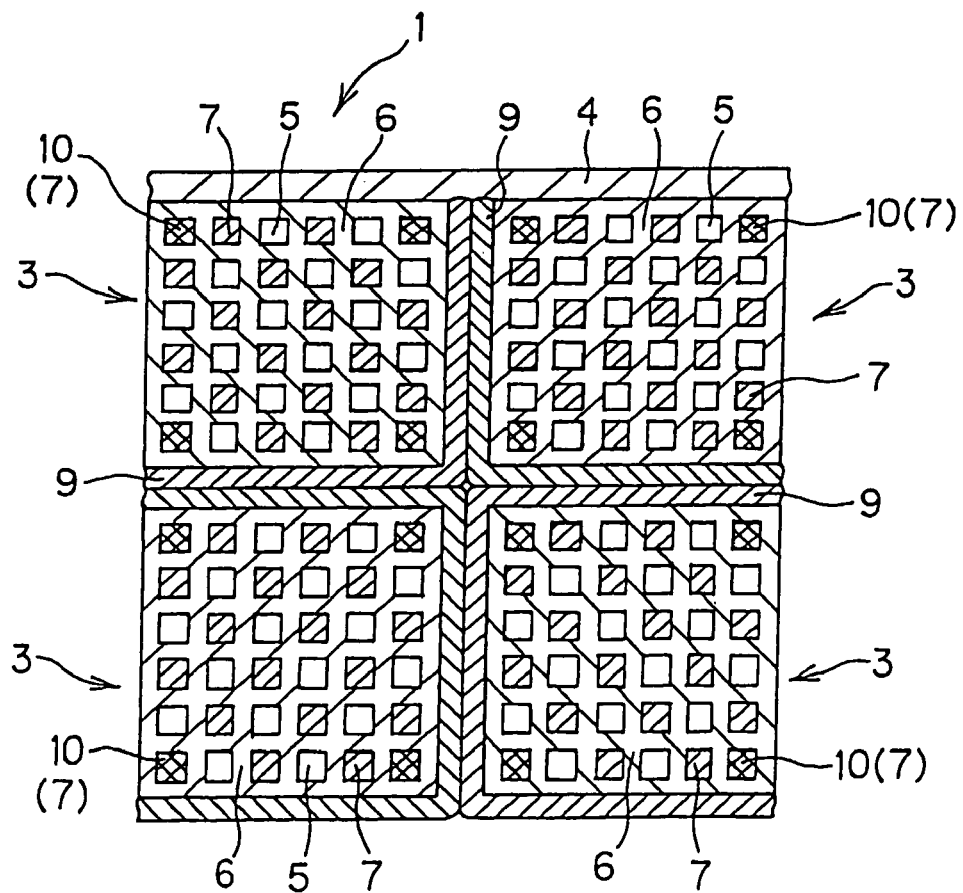
FIG. 4 is an enlarged view of the main part of FIG. 3.

FIG. 1 is a perspective view schematically showing an example of a honeycomb segment of the present invention, and FIG. 2 is an A-A sectional view in FIG. 1. FIG. 3 is a perspective view schematically showing an example (having a circular shape of the whole cross-section taken on a plane perpendicular to the central axis) of a honeycomb structure using a honeycomb segment of the present invention, and FIG. 4 is an enlarged view of the main part of FIG. 3.

Here, as shown in FIGS. 1 and 2, a honeycomb segment 3 of the present invention has a shape of constituting a part of the whole structure of a honeycomb structure 1 (honeycomb segment joined body) and constituting the whole structure by being incorporated in a direction perpendicular to the central axis of the honeycomb structure 1. Cells 5 are disposed in parallel to each other in the central axis direction of the honeycomb structure 1. Each end portion of adjacent cells 5 are alternately plugged with a plugging material 7. The cells 8 at four corners of the honeycomb segment 2 are plugged on both end faces with a plugging material 7. That is, plugged portions 10 are formed in cells at four corners on both end faces of the honeycomb segment 3.

As shown in FIGS. 1 and 2, predetermined cells 5 (inflow cells) are open on the left end portion side, while the cells are plugged with a plugging material 7 on the right end portion side. The other cells 5 (outflow cells) adjacent to the inflow cells are plugged with a plugging material 7 on the left end portion side, while the cells are open on the right end portion side. By such plugging, each of the end faces of the honeycomb segment 2 shows a checkerwise pattern as shown in FIG. 1. In the case that a honeycomb structure 1 having a plurality of honeycomb segments 2 joined with one another is disposed in an exhaust gas discharge system, exhaust gas flows into cells 5 of each honeycomb segment 3 from left side in FIG. 2 and moves to the right side.

FIG. 1 shows the case that an inlet of exhaust gas is set up on the left side of the honeycomb segment 3, and exhaust gas flows into the honeycomb segment 2 from the cells 5 (inflow cell) which are open without plugging. The exhaust gas flew into the cells 5 (inflow cell) passes through porous partition walls 6 and discharged from the other cells 5 (outflow cell). When the exhaust gas passes through the partition walls 6, particulate matter containing soot in exhaust gas is trapped with the partition walls 6. Thus, exhaust gas can be purified. By such trapping, particulate matter containing soot is accumulated inside the honeycomb segment 3 in the course of time to increase pressure loss. Therefore, regeneration by combusting soot or the like is performed.

As a material for the honeycomb segment 3, it is preferable to use at least one kind of materials selected form the group consisting of silicon carbide, silicon-silicon carbide based composite material, silicon nitride, cordierite, mullite, alumina, spinel, silicon carbide-cordierite based composite material, silicon-silicon carbide composite material, lithium aluminum silicate, aluminum titanate, and Fe—Cr—Al based metals from the viewpoint of strength and thermal resistance. Above all, silicon carbide or silicon-silicon carbide based composite material is preferable.

The honeycomb segment 3 can be manufactured by, for example, adding a binder such as methylcellulose, hydroxypropoxyl cellulose, hydroxyethyl cellulose, carboxymethyl cellulose, or polyvinyl alcohol, a surfactant, water as a solvent, and the like, to a suitably selected material among the materials described above to obtain clay having plasticity, subjecting the clay to extrusion forming to give the aforementioned shape, and drying with microwaves, hot air, or the like, followed by sintering.

As the plugging material 7 used for plugging cells 5, the same material as used for the honeycomb segment 3 can be used. Plugging with the plugging material 7 can be performed by immersing an end face of the honeycomb segment 3 in a slurried plugging material 7 to fill the plugging material 7 into the opening cells 5 in the state that cells 5 to be unplugged are being masked. After forming the honeycomb segment 3, a filling of the plugging material 7 can be performed before or after firing. But it is preferable to perform the filling before firing because only one firing step is required.

After manufacturing above described honeycomb segment 3, a slurried bonding material layer (partial bonding material layer) 9 is applied on the outer peripheral surface of the honeycomb segment 3. Then a plurality of honeycomb segments 3 are incorporated so as to give a predetermined shape (the whole structure of the honeycomb structure 1). After the whole structure is press-fitted in the state that the segments are incorporated, the whole structure is subjected to drying by heating. Thus, a joined body having a plurality of honeycomb segments 3 being integrally joined is manufactured.

After joining the honeycomb segments 3 with one another, some of the cells 8 plugged with plugging material 7 located at four corners of each honeycomb segment 3 may suitably be removed if it is of no use. By this, a honeycomb structure of the present invention can make the best use of the cells without waste, and therefore it can contribute to improvement in performance of products (for example, a DPF) (see FIGS. 1 and 2).

Finally, after subjecting the joined body to cut processing to give the aforementioned shape, the outer peripheral surface is covered with a coating material 4, and then subjected to drying by heating. Thus, a honeycomb structure 1 shown in FIG. 3 is manufactured.

A honeycomb structure of the present invention is a honeycomb structure 1 provided with a honeycomb segment joined body having a plurality of honeycomb segments 3 joined at their joint faces by means of a bonding material layer and an outer peripheral coating layer 4 covering an outer peripheral surface of the honeycomb segment joined body, and also the honeycomb structure 1 has a structure in which a plurality of cells 5 functioning as fluid passages are disposed in parallel with one another in a central axis direction as shown in FIGS. 3 and 4.

Incidentally, the bonding material layer (partial bonding material layer) 9 used in the present invention is applied on an outer peripheral surface of a honeycomb segment 3 to function to join the honeycomb segments 3 with one another. The bonding material layer (partial bonding material layer) 9 can be formed by, for example, a slurried bonding material layer 9 is applied on the outer periphery surface of the honeycomb segments 3 after manufacturing the honeycomb segments 3, and incorporating the honeycomb segments to give the whole structure of the honeycomb structure 1), and press fitting the honeycomb segments 3 in the state of being incorporated, followed by drying by heating. In this case, the slurried bonding material layer 9 may be applied on the outer peripheral surface of each of the adjacent honeycomb segments 3. However, it may be applied on only one faced outer peripheral surface of the adjacent honeycomb segments 3.

Such application on only one faced outer peripheral surface is preferable in that an amount of the bonding material layer (partial bonding material layer) 9 used can be saved. Thickness of the bonding material layer (partial bonding material layer) 9 is determined by taking bonding force between the honeycomb segments 3 into consideration and suitably selected, for example, within the range of 0.2 to 4.0 mm.

Suitable examples of the bonding material layer (partial bonding material layer) 9 include ones constituted by inorganic fibers, an inorganic binder, an organic binder, and inorganic particles. Specifically, examples of the inorganic fibers include oxide fibers such as aluminosilicate and alumina, and other fibers (e.g., SiC fiber). Examples of the inorganic binder include silica sol, alumina sol, and clay. Examples of the organic binder include polyvinylalcohol (PVA), carboxymethyl cellulose (CMC), and methyl cellulose (MC). Examples of the inorganic particles include ceramics such as silicon carbide, silicon nitride, cordierite, alumina, and mullite.

The outer peripheral coating layer 4 is applied on an outer peripheral surface of a joined body of the honeycomb segments 3 and functions so as to protect the outer peripheral surface of the joined body of the honeycomb segments 2. Thickness of the outer peripheral coating layer 4 is suitably selected, for example, within the range from 0.1 to 1.5 mm.

It is preferable that the bonding material layer (partial bonding material layer) 9 and the outer peripheral coating layer 4 has a thermal conductivity of 0.1 to 5.0 W/m·k and relatively low thermal expansion coefficient within the range from $1 \times 10^{-6}$ to $8 \times 10^{-6}$ in order to inhibit a crack from being caused by thermal shock or the like.

EXAMPLES

The present invention is hereinbelow described more concretely with Examples. However, the present invention is by no means limited to these Examples.

(Preparation of Honeycomb Segment Formed Body)

As a raw material for a honeycomb segment, a SiC powder and a metal Si powder were mixed at the ratio of 80:20 by mass. To the mixture, there were added starch and a foaming resin as pore formers, methyl cellulose, hydroxypropoxylmethyl cellulose, a surfactant, and water to prepare clay having plasticity. The clay was subjected to extrusion forming and dried with microwaves and hot air to obtain a honeycomb segment formed body having a thickness of partition walls of 310 μm, a cell density of about 46.5 cells/cm² (300 cells/in.²), a 35×35 mm square cross-section, and a length of 152 mm.

Next, a photograph of an end face of the above honeycomb segment was taken with a camera, and the image was subjected to image processing to confirm the positions of the whole cells on the end face. Next, a sheet having almost the same shape as the above honeycomb segment was prepared and bonded on the whole face where the positions of the cells were recognized. Then, positions functioning as a standard set by each specifications for an outer diameter, a cell pitch, etc., were calculated for positioning on the XYZθ stage having the honeycomb segment formed body thereon on the basis of the cell positions recognized by image processing in advance. Holes were made in the sheet at the cell positions where the openings were required to accomplish the masking. Next, the masked end face of the honeycomb segment formed body was immersed in a plugging material for plugging. Then, a predetermined amount of the plugging material was sent into the cells under pressure to be filled into the cells. Then, the mask was peeled off to complete plugging on one end face. Then, the same plugging was performed on the other end face. As the plugging material, the same material as the honeycomb segment raw material was used. Finally, after dying the plugged portion on both end faces of cells, the binder was degreased at about 400° C. in an atmosphere, and then the formed body was fired at about 1450° C. in an Ar inert atmosphere to bond SiC crystalline particles with Si to give a honeycomb segment having a porous structure.

Example

The masks used had holes opened alternately on both end faces and holes opened at the four corners of each end faces of the honeycomb segment formed body. By this, in a honeycomb segment formed body obtained, both end faces of the cells 5 are plugged with the plugging material 7 so that each of the end faces has a checkerwise pattern, and plugged portions 10 were formed with the plugging material 7 in cells 8 at the four corners of the honeycomb segment 3 as shown in FIGS. 3 and 4. To be more specific, plugging was performed so that adjacent cells were plugged in the opposite end portions, and plugged portions 10 were formed in the cells at the four corners on both end faces of the honeycomb segment 3.

Comparative Example

Figure 5:
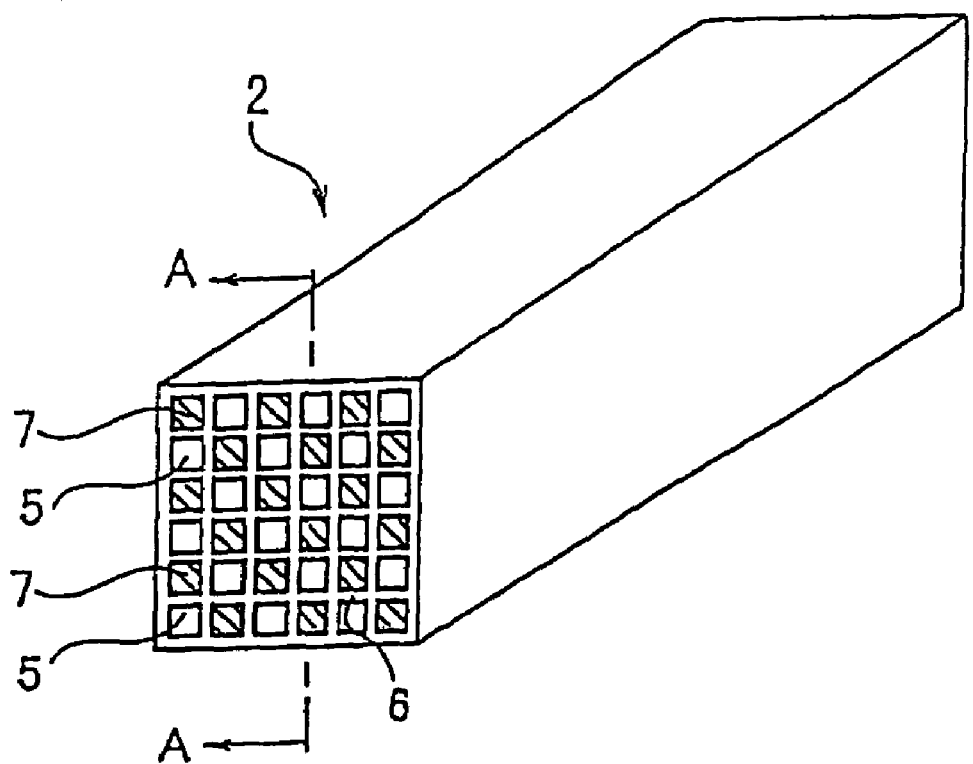
FIG. 5 is a perspective view schematically showing an example of a honeycomb segment used in a conventional honeycomb structure.
Figure 6:
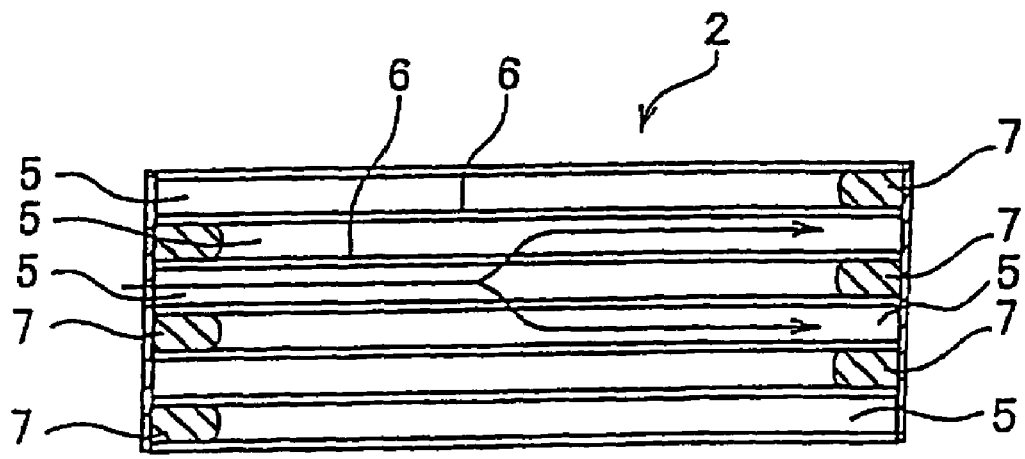
FIG. 6 is an A-A sectional view in FIG. 5.

The mask used at this time had openings alternately on both end faces of the honeycomb segment formed body. By this, a honeycomb segment formed body 2 manufactured each of the end faces of the cells 5 were plugged by the plugging material (filler) 7 so as to have a checkerwise pattern on each end face as shown in FIGS. 5 and 6. To be more specific, adjacent cells were plugged in the opposite end portions.

There were prepared each 20,000 honeycomb segments formed above methods (Example and the Comparative Example), and inspection was made with regard to occurrence of chipping (%) after firing. As a result, the occurrence of chipping was remarkably improved from 3% in the case of Comparative Example to 0.5% in the case of Example.

A honeycomb structure using a honeycomb segment of the present invention is useful as a trapping filter for exhaust gas, for example, such as a diesel particulate filter (DPF) in order to trap and remove particulate matter contained in exhaust gas from a diesel engine or the like.

What is claimed is:

1. A honeycomb segment having a plurality of cells functioning as fluid passages and disposed in parallel with one another in the central axis direction, wherein cells at four corners of both end faces of the honeycomb segment are plugged with a plugging material,
   wherein only four cells at the four corners, respectively, are plugged at both end faces, with the remaining cells plugged only at one end face.

2. The honeycomb segment according to claim 1, wherein adjacent cells of the honeycomb segment are plugged with a plugging material at opposite end faces alternately.

3. A honeycomb structure comprising:

a honeycomb segment joined body having a plurality of honeycomb segments unitarily joined at the joint faces by means of a bonding material layer, and an outer peripheral coating layer covering an outer peripheral surface of the honeycomb segment joined body, the honeycomb structure having a structure in which a plurality of cells functioning as fluid passages are disposed in parallel with one another in a central axis direction;

wherein each of the honeycomb segments is a honeycomb segment according to claim 1.

4. A honeycomb structure comprising:

a honeycomb segment joined body having a plurality of honeycomb segments unitarily joined at the joint faces by means of a bonding material layer, and an outer peripheral coating layer covering an outer peripheral surface of the honeycomb segment joined body, the honeycomb structure having a structure in which a plurality of cells functioning as fluid passages are disposed in parallel with one another in a central axis direction;

wherein each of the honeycomb segments is a honeycomb segment according to claim 2.

* * * * *